Aug. 29, 1933.  S. R. MERLEY ET AL  1,924,615
PROCESS FOR THE MANUFACTURE OF ESTERS
Filed June 11, 1928
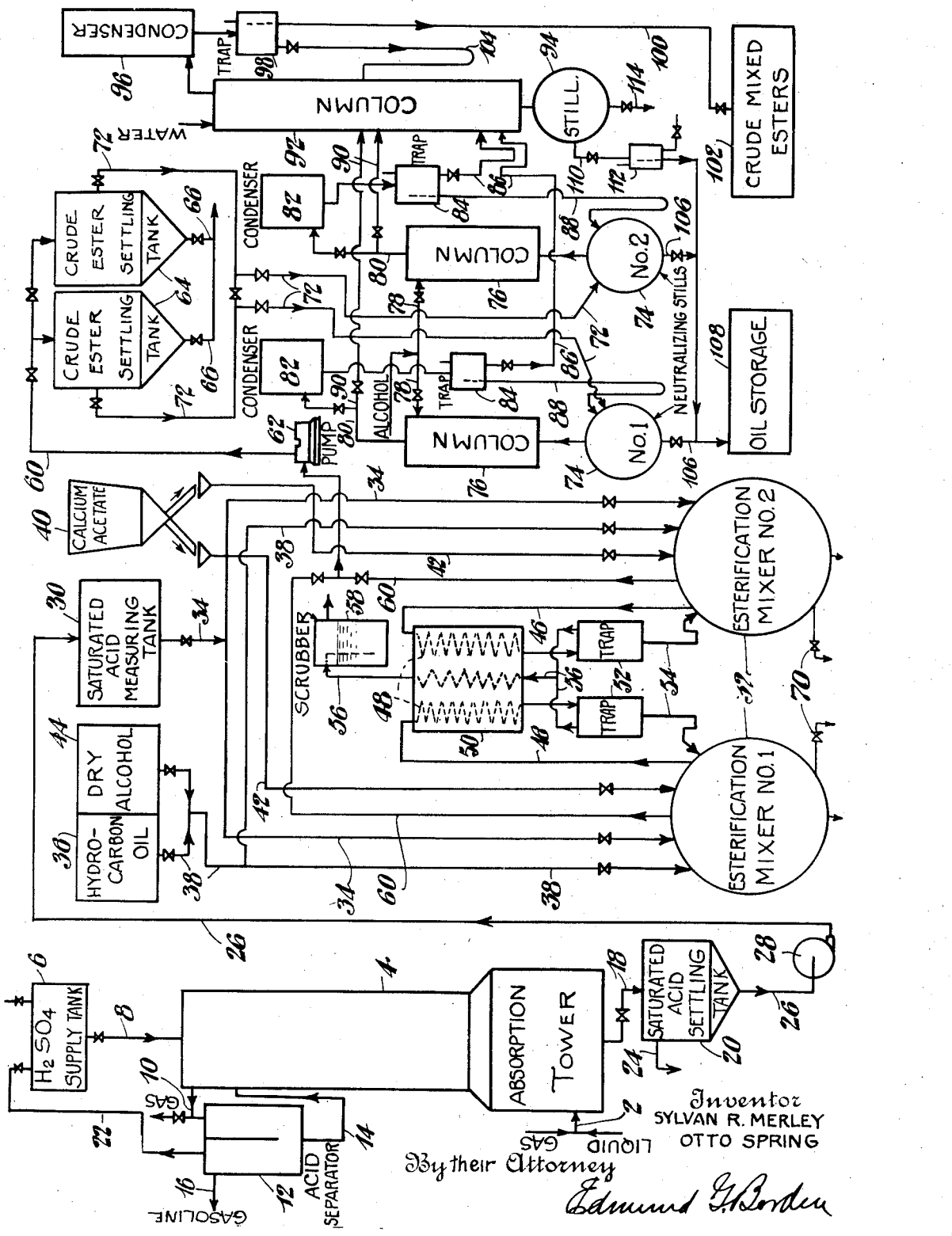
Inventor
SYLVAN R. MERLEY
OTTO SPRING
By their Attorney
Edmund G. Borden Patented Aug. 29, 1933

1,924,615

UNITED STATES PATENT OFFICE 1,924,615

PROCESS FOR THE MANUFACTURE OF ESTERS

Sylvan R. Merley, Dover, N. J., and Otto Spring, Okmulgee, Okla., assignors to Doherty Research Company, New York, N. Y., a corporation of Delaware Application June 11, 1928. Serial No. 284,347

26 Claims. (Cl. 260—106)

This invention relates to a process of and apparatus for the manufacture of organic esters.

More particularly the invention relates to the manufacture of esters from the unsaturated hydrocarbons produced by the cracking and refining of petroleum and natural gas. In the refining of petroleum considerable quantities of waste products, particularly gases, are formed which contain olefinic hydrocarbons suitable for use in the present process. Furthermore the occasion for the treatment of petroleum distillates with sulphuric acid may be taken advantage of for the purpose of recovering the olefin hydrocarbons absorbed from the distillate by the sulphuric acid. This is particularly true in the treatment of gasoline.

Processes are now known and being operated in which alcohols are produced from olefin hydrocarbons by the absorption of olefins with sulphuric acid to form alkyl sulphates and the subsequent hydrolysis of these sulphates with water to form alcohols and regenerate the sulphuric acid. Esters may be formed from these or other alcohols by treatment of the same with an organic acid in the presence of a catalyst such as sulphuric acid. It has also been proposed by Ellis and Cohen (Patents 1,365,050 and 1,365,051) to produce esters from a mixture of alkyl sulphates, obtained from petroleum by absorption with sulphuric acid, in which a mixture of the alkyl sulphates is diluted with water and the resulting mixture treated with a salt of an organic acid such as calcium acetate. While Ellis and Cohen suggest that organic esters are formed in this mixture by the direct replacement of the sulphate radical by the organic acid radical of the calcium acetate it seems reasonable to suppose that the alcohol is first formed from the dilution with water after which esters are formed by interaction with acetic acid as in the first example referred to above.

The primary object of the present invention is to overcome the defects encountered in previously used processes for the production of organic esters and to provide a process whereby organic esters may be efficiently produced on a commercial scale.

A further object of the invention is the production of tertiary esters, that is, esters corresponding to the tertiary olefins present in the oil products treated.

In accordance with this object, the process of the present invention comprises the treatment of alkyl sulphate liquor in such a way as to obtain yields of tertiary esters which will warrant their manufacture on a commercial scale. In previous processes where, for example, it was desired to produce tertiary butyl acetate from tertiary butyl alcohol and acetic acid, in the presence of a catalyst such as sulphuric acid, it has been found that a yield of approximately 6% ester is all that could be obtained. Furthermore, in attempts to prepare the esters of higher alcohols equilibrium was established with a much lower percentage of ester present. In the case of the acetate of tertiary heptyl alcohol the yield was less than 0.8 percent. One of the important features of the present invention, therefore, is to provide a commercial process for the manufacture of tertiary esters.

With these and other objects in view the features of the invention will now be described in detail in connection with the accompanying drawing in which:

The figure is a flow sheet of the process showing diagrammatically the apparatus adapted for carrying out the process.

In accordance with the invention the olefin bearing material, which may be liquid or gaseous, or a mixture thereof, and derived from any convenient source such as from the cracking and/or distillation of mineral oils or solid or gaseous hydrocarbon materials, is introduced by a conduit 2 into the base of an absorption tower 4 where it is contacted with sulphuric acid in a counter-current flow through the tower. The sulphuric acid may be conveniently taken from a supply tank 6 and introduced into the upper end of the tower 4 by a valved pipe 8.

The tower 4 is preferably of the bubbler plate type in which the acid acts as the absorbing medium to take up the olefins from the crude material. The tower is also preferably provided with suitable cooling coils so that the temperature may be held at the desired minimum (minus 5° F). As the acid advances downward through the tower it becomes more and more saturated so that by the time it reaches the base of the column it is comprised chiefly of mono- and dialkyl sulphates.

In the treatment of liquid olefin bearing materials such as low end-point gasoline, and still gases or a mixture of gas with gasoline, the gasoline or a gas-gasoline mixture passes upward through the tower, bubbling through the acid on each tray, finally leaving the tower by an offtake pipe 10, which delivers the liquid into a separator 12 where any occluded acid separates out and is returned to the tower 4 by a pipe 14. The separated gasoline substantially stripped of its olefin content is discharged from the separator by a pipe 16.

During the ordinary operation of the tower the saturated acid liquor is drawn off from the base of the tower by a valved pipe 18, and collected in a settling tank 20. Considerable trouble has been encountered when 66° Bé. acid has been used to treat liquid materials of the type referred to, because of the formation of a stable emulsion between the acid liquor and the gasoline so that the acid liquor and the gasoline could not be separately withdrawn from the tower. It was discovered, however, that this condition could be corrected by using 85% acid at temperatures such that the acid liquor would not freeze, or by bubbling a gas through the liquid on the trays in the tower. This gas preferably should be cracking still gas or other gas containing olefins of low molecular weight and may be introduced through the pipe 2. Where gas is used either as an olefin containing gas for the purpose of breaking the emulsion in the tower or for the purpose of agitation when 85% acid is used it may be vented through a valved vent on the pipe 10.

While the olefin content of a low boiling point gasoline may be effectively absorbed with sulphuric acid in the tower 4 without the addition thereto of gas, it has been found that the use of gas is very advantageous for commercial operation. By controlling the acid strength and temperatures a gas which is substantially free of olefins may be effectively used in the towers for assisting in the absorption or conversion of the olefin content of the gasoline into alkyl sulfates, and for effecting separation of the unabsorbed gasoline from the alkyl sulphuric acids. The most effective method of carrying out the absorption, however, is to use a gas containing olefin, particularly olefin of lower boiling point in admixture with the gasoline to assist in promoting the reaction and in effecting the separation of the gasoline from the alkyl sulphuric acid. The gas containing olefin such as a cracking gas or refinery gas gives an acid menstruum or alkyl sulphate wherein the alkyl compound is lower boiling point hydrocarbon, and this menstruum assists in promoting the reaction to help absorb the olefin content of the gasoline. By the use of the gas an acid mixture of better consistency and higher concentration may be effected.

The absorption in the tower may advantageously be carried out under a superatmospheric pressure of from 30 to 150 pounds per square inch, in which case an equalizing pressure line 22 is placed between the supply tank 6 and the separator 12, or the tower 4.

The settling tank 20 is made use of for the purpose of separating any gasoline or polymerized hydrocarbon which may have been occluded in the saturated acid liquor. These separated materials may be decanted off by a pipe 24. The saturated acid liquor is comprised of mono- and di-alkyl sulfates corresponding to the olefins of more than two carbon atoms, present in the gas or liquid treated. The acid liquor may also contain some sulfates of cyclic olefins and also a small amount of free sulfuric acid.

From the tank 20 suitable quantities of the alkyl sulfate liquor are conducted by a pipe 26 and a pump 28 into a measuring tank 30, where the volume of the batch to be treated is measured. The measured batch of saturated liquor is next run into one of two esterification mixers 32, by means of suitable valved piping 34. The mixers are closed, jacketed reaction vessels provided with mixing blades adapted for the thorough mixing of viscous materials.

Assuming that mixer No. 1 is charged with the saturated alkyl sulfate liquor, a quantity of hydrocarbon oil such as kerosene or other higher boiling oil, equal to about ⅕th the volume of alkyl sulfates is added from a storage 36 by means of suitable valved piping 38, which also connectes with the mixer No. 2. The agitation or mixing of the liquor and the oil is now commenced and at the same time dry commercial calcium acetate is slowly added from a storage 40 and conduit 42, and the contents of the mixer may be brought to a temperature not to exceed about 70° F. The agitation during the addition of the calcium acetate is preferably such as to leave a layer of oil over the surface of the acid liquor so that finely powdered acetate may be added through the oil and thereby become coated with oil before it actually comes into contact with the liquor. This method of agitation and addition of the acetate will avoid to a large extent any undesirable reactions with the free sulfuric acid, and thus avoid local overheating. If desired the salt of the organic acid may be previously mixed with the oil and both introduced together into the reaction chamber. The quantity of acetate added should be equivalent to approximately 80% of the free and combined sulfate or sulfuric acid in the mixture and should be thoroughly incorporated therein without permitting any substantial rise in the temperature of the batch. After the materials are thoroughly mixed the temperature of the mixture is gradually raised over a period of from thirty minutes to one hour to a point not to exceed about 195° F., at which temperature the reaction between the alkyl sulfates and calcium acetate will complete itself to produce organic esters and solid calcium sulfate. Aside from these main products, small amounts of low boiling ethers, ketones and other compounds will be formed as well as the liberation of acetic acid from any excess of calcium acetate present. In order to neutralize the bulk of this excess organic acid, dry alcohols from a storage 44 may be introduced into the reaction mixture through the conduits 38 while the reaction temperature and mixing is continued.

The use of hydrocarbon oil in the esterification of alkyl sulfates plays an important part in the process. Preferably, the oil is added to the alkyl sulfate and the calcium acetate is added directly to the surface of the oil. The oil floating on the surface of the alkyl sulfate, tends to coat the particles of calcium acetate as it comes into the reaction and acts as a stabilizer for controlling and promoting the reaction. It has been found that the time required for completing the reaction can be very greatly decreased by the use of the oil controlling menstruum. This is due to the fact that if oil is not used, a localized heating is caused by the reaction between the alkyl sulfates and the calcium acetate whereby the olefin content of the alkyl sulfate is polymerized, some of the olefins are volatilized and gases are formed which entail losses and in order to avoid these losses the calcium acetate has to be added very slowly to the alkyl sulfate solution if no oil is used. During the reaction between the calcium acetate and the alkyl sulfate solution alkyl acetates are formed and these acetates are dissolved in the oil. This solution of oil and acetate protects the acetate from the free sulfuric acid in the solution and thus prevents the polymerization and decomposition of the acetate being formed. Furthermore, the oil gives a liquid menstruum in the reaction chamber which aids in the separation of the calcium sulfate and the acetates. Also by having the alkyl acetates dissolved in the oil the evaporation losses of the high volatile acetates are practically avoided. In the esterification mixers the use of oil allows the acetification of the alkyl sulfate solution to proceed as a substantially dry reaction. Both calcium sulfate and sulfuric acid act as dehydrating agents and it is found that some water is necessary for the proper crystallization of the calcium sulfate in order to separate the sulfate from the acetates. The oil tends to absorb the acetates while the calcium sulfate occludes and attracts the sulfuric acid, and by having an intermediary oil menstruum body the calcium sulfate may be readily separated from the acetate in solution. It has been found that if no oil is used the calcium sulfate tends to set and give a stiff, muddy mixture of calcium acetate, alkyl sulfate and calcium sulfate so that the reaction between the products cannot be properly controlled.

A further advantage resulting from the use of oil in the reaction mixers and stills is due to the fact that the oil coats the acid particles and walls of the apparatus and thereby protects the same from corrosion. The metal of which the apparatus is preferably made is more readily "wetted" by oil than acid.

The neutralization of the excess organic acid present in the reaction mixture may be carried out in a separate chamber by decanting off the ester and oil layer from the reaction mixture and neutralizing the same either with dry alcohols or with lime. If desired the excess organic acid may be directly neutralized by introducing lime into the reaction mixer and steam distilling off the esters which were formed in the esterification reaction. This procedure, however, causes the loss of the excess organic acid and also results in a lower yield of esters. The preferred method is the addition of dry alcohols to the esterification mass in order to take advantage of the dehydrating value of the calcium sulfate and sulfuric acid for the esterification or neutralization reaction between the added alcohols and acetic acid present in the mixture. In this connection, it has been found that the water formed in this step of the process causes the setting or granulation of the calcium sulfate and thereby facilitates its precipitation in the mixture. While it is preferred to neutralize part of the excess organic acid while the esters are in the mixer, it has been found inadvisable to complete the neutralization therein because of the free sulfuric acid present, since any rise in temperature would cause decomposition of the tertiary esters and part of the secondary esters.

The light ethers, esters, ketones and other compounds as well as part of the alcohol added may be volatile at the temperatures employed so in order to prevent their loss from the system the esterification mixers are provided with a refluxing system which comprises vapor lines 46, condensing coils 48 mounted in a cooler 50, condensate traps 52, condensate return lines 54 and gas or uncondensed vapor conduits 56 which lead through the cooler 50. The gas conducted away by the lines 56 contains $SO_2$ and very light ethers, ketones and aldehydes. This gas is therefore scrubbed in a scrubber 58 with an alkaline solution to remove the $SO_2$ after which the remaining vapors may be recovered by refrigeration.

In order to make the process continuous two reaction mixers are used so that while one is being emptied and cleaned the other may be set in operation. After the completion of the reaction and partial neutralization in either mixer its contents are again cooled down to normal and the mixture allowed to settle for a short time, then the ester or oily layer is decanted off and the calcium sulphate residue washed with oil to remove occluded esters, the ester layer and washings being conducted by valved pipes 60 and pump 62 to one of two settling tanks 64. The oily layer and washings taken from the mixers 32 comprises the hydrocarbon oil added, the esters formed, acetic acid, alcohols and small amounts of impurities such as polymers, and occluded calcium sulphate. The settling tanks 64 permit the separation of any sludge acid or residual material from the ester-oil mixture by means of valved drain pipes 66.

The residue remaining in the mixers after the removal of the mixed esters and oil consists mainly of solid calcium sulphate and occluded sulphuric acid, which may be removed through cleanouts 70.

In order to produce relatively pure esters free from acetic acid and the oil used in the reaction, the mixture in the tanks 64 is treated in the following manner: A batch of mixed esters is drawn from either of the tanks 64 by means of suitable valved piping 72 and passed to either one of two neutralizing stills 74 which may be run in succession in order to make the process continuous. Each of these stills is constructed alike and may be heated in any suitable manner, each still is also provided with a reflux column 76. The batch of esters and oil in the neutralizing still is heated to produce vaporization. As the vapors pass upward through the column 76 dry alcohol or alcohols are introduced into the upper portion of the column as by means of a valved conduit 78, or the alcohol may be introduced into the still 74. The alcohol serves to neutralize any acetic acid which may be present in the mixture. During the refluxing and neutralizing operation vapors are conducted from the column by means of a valved vapor line 80 and condensed in a condenser 82, the condensate falling back into a trap 84 where the water is removed by a pipe 86 and the ester, oil and alcohol layer returned to the still 74 by means of a liquid sealed return line 88. The water removed by the traps 84 is the water of reaction produced in the neutralization of the acetic acid by the alcohol. After the acetic acid in the ester mixture has been completely neutralized the introduction of alcohol is discontinued and the vapor stream is then diverted from the condenser 82 through a vapor line 90 into the mid-portion of a rectifying column 92.

The alcohol introduced into the columns 76 may be introduced in small quantities as the neutralization proceeds or the whole amount calculated to be necessary may be introduced into the stills 74 before the distillation is commenced.

The column 92 together with a still 94, a condenser 96 and a separator trap 98 is operated essentially as a steam distilling unit. The vapors introduced into the mid-portion of the column 92 are comprised of mixed esters and light fractions of the hydrocarbon oil used in the reaction mixers 32 when the oil used in the mixers is a relatively low boiling point oil such as light kerosene, but the greater portion of the hydrocarbon constituents carried by these vapors are derived from the hydrocarbon polymer material dissolved in the saturated acid withdrawn from the absorption tower 4. These vapors immediately come into contact with water passing down the column or with steam passing up. The water serves to cool the ester-oil vapor and condense the oil while the esters steam distil over into the condenser 96, where they are condensed and collected in the separator 98. The esters are insoluble in the water collected in the separator 98 and are therefore decanted off by a pipe 100 into a receiver 102, while the water is returned to the column by liquid sealed return line 104.

The cooling and steam distilling effect of the water in the column 92 may be best illustrated by a specific example. An isopropyl acetate fraction with light hydrocarbons from one of the columns 76 will enter the rectifying column 92 at a temperature of about 89° C., but isopropyl acetate disstills with water at 76.4° C., therefore the temperature of the entering vapors may be lowered about 12° C. and still be high enough to steam distill the ester; at the same time this lowering temperature serves to condense the oil vapors. This cooling therefore is conveniently effected by the introduction of water into the upper portion of the column 92, or other points in the column. For example, the water from the traps 84 is preferably introduced into the column 92 by the pipes 86 so that any esters which may be present therein may be recovered.

The stills 74 are preferably operated alternately in such a manner that the column 92 may be operated continuously. When the esters in either of the stills 74 have been completely driven over into the column 92 the remaining oil is drained therefrom by means of a valved cleanout pipe 106, into an oil storage tank 108. The still is then ready for a new batch of esters.

The still 94 serves mainly for supplying heat and steam for the column 92 and as a collection vessel for oil and water, the former being decanted by means of a valved pipe 110, into a separator 112 where the oil and any water present therein may be separated. The separated oil is sent to the storage 108. The still 94 is also provided with a valved cleanout drain 114, which may be used to draw off the water layer from the still.

Certain elements of the apparatus such as the reaction mixers 32, the tanks 64 and the stills 74, together with their related equipment, have been shown in duplicate for the purpose of illustrating the process as operated continuously. It is to be understood that it may be operated with but a single reaction chamber 32 or still 74, or with more than two of these units in order to properly economize the manufacture and utilize the capacity of the tower 4 and purifying column 92.

One of the important features of the present invention is the production of tertiary esters corresponding to the tertiary olefins present in cracked petroleum products. It is highly important therefore that the absorption in the tower 4 be carried out under such conditions as to cause a minimum of polymerization of the olefins. For example, the temperature at the base of the tower where the olefins first contact the acid liquor should be in the neighborhood of about −5° F., while the temperature at the top of the tower may be much higher, or about 30 to 60° F. The rate of passage of the olefins and acid through the tower is preferably such that substantially all of the acid is fully saturated and substantially all of the olefins are removed from the product treated. These conditions together with the use of the lowest temperature possible without freezing the acid are such as to favor the absorption of the tertiary olefins without substantial decomposition. It is generally recognized that tertiary organic compounds are much more unstable and more difficult to prepare than the primary and secondary. In fact the experiments conducted in connection with this process show that even though the tertiary olefins may be converted to the tertiary sulphates by carefully controlling the absorption in the tower 4, only minute quantities of tertiary organic esters will be formed if the acid liquor is diluted with water before addition of the esterifying agent, such as calcium acetate. It is therefore very important that the esterification reaction be carried out under substantially anhydrous conditions in order to obtain the tertiary esters, or to obtain a paying yield of any esters. Under all circumstances the esterification should be conducted under such conditions that the concentration of sulphuric acid is such as to have a greater affinity for any water of dilution in the original acid or acid liquor, or for any moisture present in the "dry" commercial calcium acetate, than the alkyl radical would in order to be converted (hydrolyzed) to the alcohol. And yet the acid must not be present in such a concentration or at such a temperature or both as to convert the alkyl sulphates into polymer bodies or other decomposition products.

The dry alcohol which is used in the esterification mixer 32 and in the neutralizing stills 74 may be any one of the alcohols derived from olefins of the same character as the acetates are derived from. Generally the acetates in the mixer 32 and still 74 are mixtures of acetates comprising principally isopropyl acetate, secondary butyl acetate, secondary amyl acetate, secondary hexyl acetate and secondary heptyl acetate. Furthermore, the mixture may also contain the secondary octyl, nonyl and decyl acetates as well as tertiary butyl and amyl acetates. Preferably therefore the alcohols would be the corresponding secondary and tertiary alcohols derived from the secondary and tertiary olefins. It has been found however that the alcohols having the higher boiling points, that is, the alcohols higher than butyl may be acetified much more readily than the lower alcohols. Therefore the time required for neutralization of the excess acetic acid may be materially reduced by using the higher boiling point alcohols. Thus if it is desired to produce the esters derived from higher boiling alcohols the higher alcohols may be used for the neutralizing operation. In the commercial process two forms of dry alcohol are employed for neutralizing, one alcohol is a so-called low boiling alcohol comprising principally isopropyl alcohol and some secondary butyl. The other alcohol is a mixture of the alcohols higher in the olefin series than propylene, i. e., secondary butyl, amyl, hexyl and the higher alcohols.

While in describing the process of the invention specific mention has been made of the treatment of mixtures of olefins present in various petroleum products and the production of mixed esters therefrom it is to be understood that the process is applicable for the production of individual esters or of specific groups. For example where it is desired to produce tertiary hexyl propionate, "tertiary" hexylene may be obtained and subjected to the process outlined above, in which the esterifying salt would be a salt of propionic acid, such as calcium, sodium or other available propionate. A particular fraction of gasoline or kerosene containing particular olefins boiling in a definite temperature range may be treated by the same process.

The formation of the organic esters in the process described above by the direct replacement of the inorganic acid radical by an organic acid radical is apparently accelerated by the use of a salt of the organic acid which will have considerable affinity for the inorganic acid radical, although this factor is not as important as it would be if the reaction could be carried out in the presence of water. Any available salt of the desired organic acid may be used.

Organic esters may be conveniently made with other starting materials particularly if these materials happen to be inexpensive at the place of manufacture. For example, a halogen acid such as hydrobromic or hydroiodic may be used to react with the olefin to yield the alkyl ester (or halide) after which the halogen may be replaced by any desired organic acid radical from a suitable salt. The treatment of an alkyl chloride with a calcium salt of an organic acid gives besides the organic ester, calcium chloride which would prevent the hydrolysis of the ester during its formation and insure its dryness for subsequent distillation. In such reactions it is preferred to have a small amount of inorganic acid present in the mixture. The invention is not limited to any particular method of making the alkyl ester of the inorganic acid, such as alkyl chloride since these compounds may be made from saturated hydrocarbons by direct chlorination. Furthermore, the alkyl di-halogen compounds may be esterified in the same manner as the mono-derivatives, to give either the halogen organic esters or the alkyl di-esters such as isobutylene propionate or other alkyl di-propionates or esters of similar structure.

In the use of a hydrocarbon oil in the esterification step, the oil, which may be gas oil or other oil not having too high a viscosity, is not agitated with the acid liquor to such an extent as to cause complete emulsification. The main purposes of the oil is to increase the fluidity of the mixture and to aid in tempering the reaction during the addition of the esterifying salt.

Having described the invention in its preferred form what is claimed as new is:

1. In the process of manufacturing tertiary alkyl organic esters from a tertiary alkyl sulphate containing product, by reacting therewith an inorganic salt of an organic carboxylic acid, the improvement which comprises mixing a substantial quantity of saturated liquid hydrocarbons with the sulphate product and incorporating with the resulting mixture the inorganic salt of an organic acid, agitating the resulting mixture and gradually raising the temperature thereof to approximately 190° F. whereby tertiary alkyl organic esters are formed and thereafter separating the resulting esters from the reaction residue.

2. In the process of making tertiary organic esters from an inorganic ester product by reacting therewith an inorganic salt of a carboxylic organic acid, the improvement which comprises carrying out the reaction between the inorganic ester and the salt of the carboxylic acid under substantially anhydrous conditions, separating the resulting tertiary organic ester from the reaction mixture, adding a quantity of dry alcohol to neutralize any excess organic acid present in the resulting ester product, and steam distilling the mixture to recover the tertiary organic ester.

3. In the process of manufacturing organic esters corresponding to tertiary alcohols by reacting tertiary alkyl sulfates with an inorganic salt of a carboxylic organic acid, the improvement which comprises mixing a hydrocarbon oil with a quantity of tertiary alkyl sulphates, agitating the resulting mixture and slowly adding the salt of the organic acid in a quantity equivalent to substantially 80% of the sulphate present in the mixture, thereafter increasing the temperature of the resulting mixture to a point not exceeding 195° F. whereby the sulphate radical is replaced by the organic acid radical, adding a quantity of dry alcohol to the mixture to partially neutralize excess organic acid evolved, separating the tertiary organic esters from the reaction mixture and subjecting them to reflux condensation in the presence of dry alcohol.

4. In the process of manufacturing tertiary alkyl organic esters from a mixture of tertiary alkyl sulphates by reacting therewith an inorganic salt of an organic carboxylic acid, the improvement which comprises adding to the mixture of tertiary alkyl sulphates substantially one fifth its volume of hydrocarbon oil and while simultaneously agitating and cooling the resulting mixture adding the said salt to be reacted with the alkyl sulphates, separating the resulting organic esters formed in the reaction mixture, vaporizing the separated esters and introducing the vapors into a column still in contact with water thereby steam distilling the esters from impurities contained therein.

5. In the process of manufacturing tertiary alkyl organic esters in which tertiary alkyl sulphates are reacted with an inorganic salt of an organic carboxylic acid, the improvement which comprises carrying out the reaction under substantially anhydrous conditions, maintaining the temperature during the mixing of said constituents approximately 70° F., thereafter raising the temperature to a point not to exceed 195° F. whereby the reaction between said constituents is completed, and separating the resulting esters from the residual products of the reaction.

6. In the process of manufacturing organic esters by reacting a mixture of alkyl esters of an inorganic acid with an inorganic salt of an organic carboxylic acid, the improvement which comprises mixing the alkyl esters of the inorganic acid with a hydrocarbon oil, and then while agitating the resulting mixture slowly adding the inorganic salt of the organic acid, maintaining the temperature of the mixture while adding said salt below that at which a substantial reaction occurs, thereafter raising the temperature to a point not exceeding approximately 195° F. whereby said reaction is consummated, and separating the resulting alkyl organic esters.

7. In the process of manufacturing alkyl organic esters by reacting a mixture of alkyl esters of an inorganic acid with an inorganic salt of an organic carboxylic acid, the improvement which comprises adding the salt in sufficient quantity to the alkyl esters of the inorganic acid to react with substantially all of the alkyl bodies present therein, carrying out the reaction under substantially anhydrous conditions, and adding to the resulting mixture a quantity of dry alcohol sufficient to substantially neutralize the excess organic acid formed during the reaction.

8. In the process of manufacturing organic esters by reacting a quantity of alkyl sulphates with an inorganic salt of an organic carboxylic acid, the improvement which comprises adding to the quantity of sulphates substantially one fifth its volume of hydrocarbon oil, adding to the resulting mixture the said salt while maintaining a temperature of substantially 70° F., agitating the resulting mixture and raising the temperature thereof to a point sufficient to cause replacement of the sulphate radical in said alkyl sulphates with the organic acid radical in said salt and adding a quantity of dry alcohols to said mixture to neutralize substantially all of any excess organic acid formed by said reaction.

9. In the process of manufacturing alkyl organic esters by reacting alkyl sulphates with an inorganic salt of an organic carboxylic acid, the improvement which comprises first adding a substantial quantity of hydrocarbon oil to a batch of said sulphates, agitating and cooling the resulting mixture and then adding said salt while continuing the agitation, and thereafter raising the temperature of the resulting mixture whereby alkyl organic esters are formed therein.

10. In the process of manufacturing alkyl organic esters from alkyl inorganic esters by reacting therewith an inorganic salt of an organic carboxylic acid, the improvement with comprises mixing a hydrocarbon oil with a batch of alkyl inorganic esters, agitating the resulting mixture, and simultaneously adding thereto the inorganic salt of the organic acid bringing the resulting mixture to a temperature adapted to further the reaction between the alkyl inorganic esters and said salt thereby to produce the desired organic esters, separating the resulting organic esters from the reaction mixture and subjecting the same to reflux distillation in the presence of dry alcohol whereby excess organic acid present is neutralized.

11. In the process of manufacturing alkyl organic esters from alkyl sulfates by reacting therewith an inorganic salt of an organic carboxylic acid, the improvement which comprises carrying out the reaction under substantially anhydrous conditions, separating the organic esters formed from the residual products of the reaction, and steam distilling the separated esters.

12. In the process of manufacturing mixed alkyl organic esters from a mixture of alkyl sulphates by reacting therewith an inorganic salt of an organic carboxylic acid, the improvement which comprises maintaining the temperature during the mixing of said compounds not substantially above 70° F., adding said salt in a quantity equal to substantially 80% of the sulphate present in the mixture, and thereafter increasing the temperature to a point not exceeding 195° F., thereby forming the desired alkyl organic esters.

13. In the process of manufacturing an alkyl organic ester from an alkyl inorganic ester by reacting therewith an inorganic salt of an organic carboxylic acid, the improvement which comprises mixing the said compounds under a temperature substantially below that at which the esterification reaction takes place, thereafter raising the temperature of the mixture to that at which the desired reaction is completed, carrying out the reaction under substantially anhydrous conditions, and separating the resulting ester product from the residual products of the reaction.

14. In the process of manufacturing organic esters by the interaction of an alkyl sulphate and an inorganic salt of an organic carboxylic acid, the improvement which comprises mixing the alkyl sulphate, a hydrocarbon oil and the said salt in a reaction chamber, heating and agitating the mixture in said chamber to effect a reaction between the alkyl sulphate and the said salt to produce the desired organic ester, introducing alcohol corresponding to the alkyl group of said alkyl sulphate into said reaction mixture thereby to neutralize a portion of any excess organic acid liberated from said salt, removing the oily layer comprising the oil and organic ester from said reaction chamber and subjecting the same to reflux distillation in the presence of additional quantities of said alcohol, condensing the vapors produced in said reflux distillation, separating the water from the condensate and returning the remainder of the condensate to the reflux operation, and thereafter separating the organic ester from the oily mixture by fractional distillation.

15. In the process of manufacturing organic esters from a mixture of alkyl sulphates by reacting therewith an inorganic salt of an organic carboxylic acid, the improvement which comprises intimately mixing said sulphates with said salt in the presence of a hydrocarbon oil under substantially anhydrous conditions, heating said mixture to cause the direct formation of organic esters from said sulphates and said salt, adding a quantity of mixed alcohols corresponding to the alkyl groups in said alkyl sulphates, and continuing the mixing of the materials until a substantial portion of the excess organic acid liberated by the reaction has been neutralized, drawing off into a reflux still the oily layer comprising oil and the esters produced, washing the residue in the reaction chamber to remove additional quantities of esters therefrom and adding it to the withdrawn oily layer in said still, adding additional quantities of said alcohols to the material in said still, and subjecting the mixture to reflux distillation for a period of time sufficient to completely neutralize any organic acid present therein, thereafter vaporizing the esters in said still and passing them into contact with water in a purifying tower thereby to cool said vapors and steam distill the esters.

16. In the process of manufacturing organic esters from a mixture of alkyl sulphates by reacting therewith an inorganic salt of an organic carboxylic acid, the improvement which comprises agitating the alkyl sulphates in a reaction mixer with a quantity of hydrocarbon oil which forms a layer over said sulphates, slowly adding the inorganic salt through said layer of oil while continuing said agitation, heating the combined mixture in the reaction mixer to effect the direct replacement of the sulphate radical in said sulphates by the organic acid radical in said salt thereby to form a mixture of organic esters, removing the oily layer containing the organic esters from said reaction mixer and subjecting the same to reflux distillation in the presence of alcohol thereby to neutralize any organic acid present in the said withdrawn layer, condensing the vapors produced in said reflux distillation, separating water from the condensate and returning the remainder of the condensate to the refluxing operation and thereafter removing the esters from said still by fractional distillation.

17. In the process of manufacturing alkyl organic esters from an alkyl ester of an inorganic acid by reacting therewith an inorganic salt of an organic carboxylic acid, the improvement which comprises mixing the alkyl ester of the inorganic acid, a hydrocarbon oil, an inorganic acid, and the inorganic salt of an organic acid, said salt being added in excess of the quantity necessary to react with the quantity of alkyl inorganic ester present in the mixture for the production of said organic ester, controlling the temperature of the resulting mixture to cause the direct formation of said organic ester and the liberation of excess organic acid from said salt, withdrawing the resulting organic ester and organic acid from the reaction mixture and neutralizing the organic acid with an alcohol.

18. In the process of manufacturing alkyl organic esters from an alkyl ester of an inorganic acid by reacting therewith an inorganic salt of a carboxylic organic acid, the improvement which comprises mixing the alkyl ester and the inorganic acid with a relatively high boiling point hydrocarbon oil and the inorganic salt of the organic acid under controlled temperature conditions in the presence of a small proportion of free inorganic acid, allowing the reaction between the alkyl ester of the inorganic acid and the salt to go to substantial completion, separating the resulting oily layer containing organic ester and organic acid from the remainder of the reaction products, dry distilling the organic ester and organic acid from the oil and neutralizing the organic acid with alcohol in the presence of the organic ester.

19. In the process of manufacturing alkyl organic esters from an alkyl ester of an inorganic acid by reacting therewith an inorganic salt of an organic carboxylic acid, the improvement which comprises mixing the alkyl ester of the inorganic acid with a relatively high boiling point hydrocarbon oil and the inorganic salt of the organic acid under substantially normal temperature conditions, gradually raising the temperature of the mixture to the point at which reaction between said alkyl ester and said salt is substantially complete, separating the resulting oily layer containing said oil, organic ester and organic acid formed in the mixture from the reaction of the mixed materials, separating the organic ester and organic acid from the oil, and neutralizing the organic acid with substantially dry alcohol in the presence of said organic ester.

20. The process of manufacturing organic esters, which comprises adding a hydrocarbon oil to a mixture of alkyl esters of an inorganic acid, agitating the resulting mixture and slowly adding a salt of an aliphatic monocarboxylic acid while maintaining a temperature below that at which a substantial reaction occurs, thereafter raising the temperature to a point not exceeding approximately 195° F., whereby said reaction is consummated, and separating the resulting alkyl organic esters formed.

21. The process of manufacturing alkyl organic esters, which comprises treating a mixture of alkyl esters of an inorganic acid under substantially anhydrous conditions with a sufficient quantity of a salt of an aliphatic monocarboxylic acid to react with substantially all of the alkyl bodies present therein, and adding to the resulting mixture a quantity of dry alcohol sufficient to substantially neutralize the excess of organic acid formed during said reaction.

22. The process of manufacturing an alkyl organic ester from an alkyl sulfate, which comprises adding a substantial quantity of hydrocarbon oil to a batch of said sulfate, agitating and cooling the mixture, adding a salt of an aliphatic monocarboxylic acid to said mixture during said agitation, and thereafter increasing the temperature of said mixture whereby an alkyl organic ester is formed therein corresponding to said acid.

23. The process of manufacturing an alkyl ester of an organic acid from an alkyl sulfate under substantially anhydrous conditions, which comprises replacing the sulfate radical of said alkyl sulfate with an aliphatic monocarboxylic acid radical by treating said sulfate under substantially anhydrous conditions with a salt of an aliphatic monocarboxylic acid, separating the resulting organic ester formed from the residual products of the reaction and distilling the same.

24. The process of manufacturing an alkyl organic ester from an alkyl inorganic ester, which comprises mixing an alkyl inorganic ester under substantially anhydrous conditions with a salt of an aliphatic monocarboxylic acid while maintaining a temperature substantially below that at which the esterifying reaction takes place, and after the mixing of said compounds raising the temperature of the mixture to that at which the desired reaction takes place, whereby the inorganic acid radical is replaced by the aliphatic monocarboxylic acid radical, and separating the resulting ester product from the residual products of the reaction.

25. The process of manufacturing organic esters, which comprises introducing an alkyl sulfate, a hydrocarbon oil and a salt of an aliphatic monocarboxylic acid into a reaction chamber, heating and agitating the mixture in said chamber to effect a reaction between the alkyl sulfate and the salt of the aliphatic monocarboxylic acid to produce an organic ester, introducing an alcohol corresponding to the alkyl group of said alkyl sulfate into said reaction mixture thereby to neutralize a portion of the excess aliphatic monocarboxylic acid liberated from said salt, removing the oily layer comprising the oil and organic ester from said reaction chamber and subjecting the same to reflux distillation in the presence of additional quantities of said alcohol, condensing the vapors produced in said reflux distillation, separating the water from the condensate and returning the remainder of the condensate to the refluxing operation, and thereafter separating the organic ester from the oily mixture by fractional distillation.

26. The process of manufacturing alkyl organic esters, which comprises mixing a quantity of an alkyl ester of an inorganic acid under substantially anhydrous conditions with a hydrocarbon oil, inorganic acid and a salt of an aliphatic monocarboxylic acid, said salt being in excess of the quantity necessary to react with said quantity of alkyl inorganic ester for the production of said organic ester, controlling the temperature of the resulting mixture to cause the direct formation of said organic ester and the liberation of excess aliphatic monocarboxylic acid from said salt, withdrawing the resulting organic ester and aliphatic monocarboxylic acid from the reaction mixture, and neutralizing the aliphatic monocarboxylic acid with an alcohol.

SYLVAN R. MERLEY.
OTTO SPRING.